US011167408B2

(12) United States Patent
Thomas (10) Patent No.: US 11,167,408 B2
(45) Date of Patent: Nov. 9, 2021

(54) ROBOTIC SYSTEM FOR CARRYING OUT AN OPERATION

(71) Applicant: Hughen Gerrard Thomas, Maharashtra (IN)

(72) Inventor: Hughen Gerrard Thomas, Maharashtra (IN)

(*) Notice: Subject to any disclaimer, the term of this patent is extended or adjusted under 35 U.S.C. 154(b) by 475 days.

(21) Appl. No.: 16/332,205

(22) PCT Filed: Apr. 21, 2017

(86) PCT No.: PCT/IB2017/052297
§ 371 (c)(1),
(2) Date: Mar. 11, 2019

(87) PCT Pub. No.: WO2017/182990
PCT Pub. Date: Oct. 26, 2017

(65) Prior Publication Data
US 2019/0270195 A1    Sep. 5, 2019

(30) Foreign Application Priority Data
Apr. 21, 2016   (IN) ................. 20161013990

(51) Int. Cl.
*B25J 9/04*      (2006.01)
*B25J 5/02*      (2006.01)
(Continued)

(52) U.S. Cl.
CPC .................. *B25J 5/02* (2013.01); *B25J 9/023* (2013.01); *B25J 9/04* (2013.01); *B25J 9/06* (2013.01); *B25J 9/1692* (2013.01)

(58) Field of Classification Search
CPC ........ B23Q 1/5462; B23Q 1/032; B23Q 1/48; B23Q 1/4852; B23Q 1/52; B23Q 1/56;
(Continued)

(56) References Cited

U.S. PATENT DOCUMENTS 3,836,025 A * 9/1974 Olson ................ B66F 9/0655
                                                414/547
3,960,285 A * 6/1976 Gano ................. E02F 3/286
                                                414/718
(Continued)

FOREIGN PATENT DOCUMENTS

WO        WO-8301407 A1      4/1983

OTHER PUBLICATIONS

Masia et al., A Modular Mechatronic Device for Arm Stiffness Estimation in Human-Robot Interaction, 2014, IEEE, pg. (Year: 2010).*

(Continued)

*Primary Examiner* — McDieunel Marc
(74) *Attorney, Agent, or Firm* — Panitch Schwarze Belisario & Nadel LLP (57) ABSTRACT

A robotic system for carrying out an operation is provided. The robotic system is lightweight. The principle application of the robotic system is in manufacturing industry typically to hold a tool that can perform various operations. The robotic system includes a first carriage, an arm, an arm swiveling mechanism, a second carriage, a first displacement mechanism, and a controller. The first carriage is configured to be linearly displaced. The arm is coupled to the first carriage. The second carriage is connected to a free end of the arm, and is configured to securely hold the tool. The first displacement mechanism is configured to displace the second carriage.

19 Claims, 7 Drawing Sheets

(51) Int. Cl.
*B25J 9/06* (2006.01)
*B25J 9/16* (2006.01)
*B25J 9/02* (2006.01)

(58) Field of Classification Search
CPC .... B25J 17/0266; B25J 9/0036; B25J 9/0042; B25J 9/0072; B25J 5/02; B25J 9/0018; B25J 9/0027; B25J 9/023; B25J 9/04; B25J 9/06; B25J 9/1692; B25J 11/00; B25J 15/026; B25J 9/0009; B25J 9/102; B25J 9/106; Y10T 74/20335; Y10T 74/20341; B41J 2/16547; B41J 11/006; B41J 11/007; B41J 11/22; B41J 11/42; B41J 13/0018; B41J 13/14; B41J 13/32; B41J 25/001; B41J 29/023; B41J 29/38; B41J 2/16508; B41J 2/16538; B41J 2/16585; B41J 2/1752; B41J 2/17526; B41J 35/26; B41J 3/54; B66F 11/048; F16M 11/046; F16M 11/121; F16M 11/18; F16M 11/2064; F16M 11/2092; F16M 11/42; G03B 17/561; G03B 19/18; A61B 10/0275; A61B 2010/0208; B01J 4/02; B01L 3/021; B01L 3/0213; B64C 1/22; B65H 35/02; E04H 6/04; E04H 6/182; E04H 6/183; E04H 6/22; E04H 6/245; E04H 6/305; E04H 6/424; E04H 6/426; F04C 15/0053; F16D 1/101; F16D 3/04; F16D 3/44; G01N 35/1004; G01N 35/1016; G01N 35/109; G05B 19/16; G05B 2219/36498; G21F 7/068; H01L 21/68; H04N 1/00525; H04N 1/0053; H04N 1/00535; H04N 1/00538; H04N 1/121; H04N 2201/0094

See application file for complete search history.

(56) References Cited

U.S. PATENT DOCUMENTS

| | | | |
|---|---|---|---|
| 4,978,274 A * | 12/1990 | de Groot | B25J 9/042 |
| | | | 414/744.3 |
| 6,085,670 A * | 7/2000 | Genov | B23Q 1/032 |
| | | | 108/144.11 |
| 8,282,333 B2 | 10/2012 | Oda et al. | |
| 8,621,954 B1 * | 1/2014 | Dellon | 74/490.01 |
| 2017/0205688 A1 * | 7/2017 | Chapman | G03B 17/561 |

OTHER PUBLICATIONS

Wang et al., Feedback Control of Vibrations in a Moving Flexible Robot Arm With Rotary and Prismatic Joints, 1987, IEEE, p. 1683-1689 (Year: 1987).*

Int'l Search Report dated Jul. 13, 2017 in Int'l Application No. PCT/IB2017/052297.

* cited by examiner

ROBOTIC SYSTEM FOR CARRYING OUT AN OPERATION

CROSS-REFERENCE TO RELATED APPLICATION

This application is a Section 371 of International Application No. PCT/IB2017/052297, filed Apr. 21, 2017, which was published in the English language on Oct. 26, 2017, under International Publication No. WO 2017/182990 A1, which claims priority under 35 U.S.C. § 119(b) to Indian Patent Application No. 201621013990, filed on Apr. 21, 2016, the disclosures of which are incorporated herein by reference in their entireties.

FIELD

The present disclosure relates to the field of robotic systems.

BACKGROUND

Conventionally, a gantry and rail system is used in the manufacturing industry to hold and displace objects. Typically, tools are held in a carriage assembly connected to the gantry to perform various operations. The gantry system is controlled by a computerized numerical control. For example, in a plasma cutting systems, a plasma torch is coupled to the carriage assembly which is connected to the gantry to make a hole in a workpiece. However, the aforementioned system is bulky. Further, the moving mass of the aforementioned system is excessive, thereby resulting in higher inertia. Furthermore, the conventional system requires more number of mechanical and electrical components. Thus, the conventional system is costly. Due to use of large number of motors, the operational speed of the conventional system is low, thereby increasing the cycle time. The conventional system is expensive, requires frequent maintenance, requires more installation time, have slow operating speed, and have high cycle time.

Further, the conventional system employs at least one rail along the side of the system, thereby limiting the coverage area for performing an operation. Typically, the conventional system is able to operate only in 180° work zone, thereby restricting the access to remaining 180° work zone.

Typically, conventional bridge type gantry systems are bulky in nature, and have higher moving mass. Further, in conventional bridge type gantry systems, the synchronization of two motors employed is an essential part, which adds to the manufacturing cost. The conventional bridge type gantry systems require heavy structure to connect the two motors. Further, in the conventional bridge type gantry systems, a work zone can be created only between two rails. Additionally, aligning the two rails in the gantry systems is a cumbersome task, and increases the installation time.

Typically, in a conventional cantilever system, an arm experiences vibrations. Further, increasing the reach of the arm in the conventional cantilever beam increases the vibrations and reduces the accuracy of the system. Furthermore, in the cantilever systems, a work zone can be formed only at one side of the system.

Typically, in a conventional articulated arm robotic system, to increase the reach of an arm, size of the system needs to be increased, thereby adding to the manufacturing cost. Further, to increase the payload bearing capacity, size of the robotic system needs to be increased.

Furthermore, the robotic system requires a large number of motors for performing an operation, thereby increasing the cost of the electrical components.

A SCARA (Selective Compliance Articulated Robot Arm) robotic system has a complicated mechanical structure, and requires large number of motors to perform an operation. Further, the SCARA system faces accuracy issues due to restricted movement of an arm thereof. To increase the reach of the arm of the SCARA system, the size of the system needs to be increased which adds to the manufacturing cost.

Therefore, there is felt a need for a robotic system that alleviates the above mentioned drawbacks of the conventional systems.

OBJECTS

Some of the objects of the present disclosure, which at least one embodiment herein satisfies, are as follows:

An object of the present disclosure is to provide a robotic system that operates in multiple work zones covering 360 degrees.

Another object of the present disclosure is to provide a robotic system that has lower inertia.

Yet another object of the present disclosure is to provide a robotic system that is easy to transport.

Still another object of the present disclosure is to provide a robotic system that facilities enhanced reach for a tool.

Yet another object of the present disclosure is to provide a robotic system that is lightweight.

Another object of the present disclosure is to provide a robotic system that is less expensive.

Another object of the present disclosure is to provide a robotic system that is easy to install.

Another object of the present disclosure is to provide a robotic system that has pre-aligned internal components.

Yet another object of the present disclosure is to provide a robotic system that has a low operating cycle time.

Yet another object of the present disclosure is to provide a robotic system that occupies less space, thereby saving valuable space on the shop floor.

Other objects and advantages of the present disclosure will be more apparent from the following description, which is not intended to limit the scope of the present disclosure.

SUMMARY

The present disclosure envisages a robotic system for carrying out an operation. The robotic system comprises a first carriage, an arm, an arm swiveling mechanism, a second carriage, a first displacement mechanism, and a controller. The first carriage is configured to be linearly displaced. The arm is coupled to the first carriage. The arm swiveling mechanism is coupled to the first carriage and the arm, and is configured to angularly displace the arm when the first carriage is linearly displaced. The second carriage is coupled to a free end of the arm. The first displacement mechanism is coupled to the second carriage and the arm, and is configured to displace the second carriage about the free end of the arm. The controller is adapted for synchronizing the movement of the arm, the first carriage, and the second carriage to perform an operation.

The arm swiveling mechanism includes a first motor configured to rotate the arm about the first carriage.

In an embodiment, the system comprises a supporting structure configured to facilitate linear displacement of the first carriage thereon. In an embodiment, at least one rail is configured on the supporting structure to facilitate linear movement of the first carriage thereon.

In another embodiment, the system comprises a second displacement mechanism coupled to the first carriage and configured to facilitate linear displacement of the first carriage along the supporting structure. The second displacement mechanism includes a second motor configured to facilitate sliding movement of the first carriage along the supporting structure.

In an embodiment, the first displacement mechanism includes a third motor, and is configured to linearly move the second carriage in an operative upward and an operative downward direction.

In an embodiment, the system further comprises a tool swiveling mechanism coupled with the second carriage, and configured to rotate the tool about the free end of the arm. The tool swiveling mechanism includes at least one motor configured to facilitate swiveling movement of the tool.

In another embodiment, the tool is coupled with the second carriage via an articulated robotic arm, a robotic wrist, or any combination thereof to rotate the tool.

In an embodiment, the system comprises a trolley configured to linearly displace the first carriage.

In an embodiment, the operation is selected from the group consisting of welding, cutting, grasping an object, moving an object from one place to another, and lifting an object.

In an embodiment, the second carriage is configured to hold a tool for performing the operation.

In an embodiment, the arm swiveling mechanism is configured to move the arm about the first carriage along the rotary C-axis.

In an embodiment, the system comprises an arm sliding mechanism connected to the first carriage and the arm, and configured to linearly displace the arm about the first carriage. The arm sliding mechanism includes a rack, a pinion, and a fifth motor. The rack is connected to the arm. The pinion abuts the rack, and is connected to the first carriage. The fifth motor is coupled to the pinion, and configured to rotate the pinion.

In an embodiment, the system further comprises a rotating member disposed at each operative end of the rail, and configured to facilitate rotational movement of the rail, thereby rotating the first carriage.

In an embodiment, the system comprises a first carriage swiveling mechanism coupled with the first carriage, and configured to rotate the first carriage.

In an embodiment, the supporting structure is securely suspended at a predetermined height from the ground level, and the first carriage is securely connected to an operative bottom portion of the supporting structure.

In an embodiment, the system further comprises an arm rotation mechanism configured to facilitate rotational movement of the arm about the longitudinal axis of the arm.

BRIEF DESCRIPTION OF THE ACCOMPANYING DRAWING

A robotic system for carrying out an operation, of the present disclosure, will now be described with the help of the accompanying drawing, in which.

LIST OF REFERENCE NUMERALS

100—Conventional bridge gantry system
102—Tool
104—Tool carriage assembly
106—Gantry
108—Rail system
110—Workpiece
112—Cutting table
200—Robotic system
202—Arm
202a—Operative end of the arm
202b—free end of the arm
203—First displacement mechanism
204—Supporting structure
205—Rail
206—First Carriage
208—Second Carriage
209—Tool
210—Arm swiveling mechanism
212—Rack

DETAILED DESCRIPTION

Conventionally, a gantry and rail system is used in the manufacturing industry to hold and displace objects or carrying out an operation using various tools. Typically, tools are held in a carriage assembly connected to the gantry to perform various operations. The bridge gantry system is controlled by a computerized numerical control machines.

Figure 1:
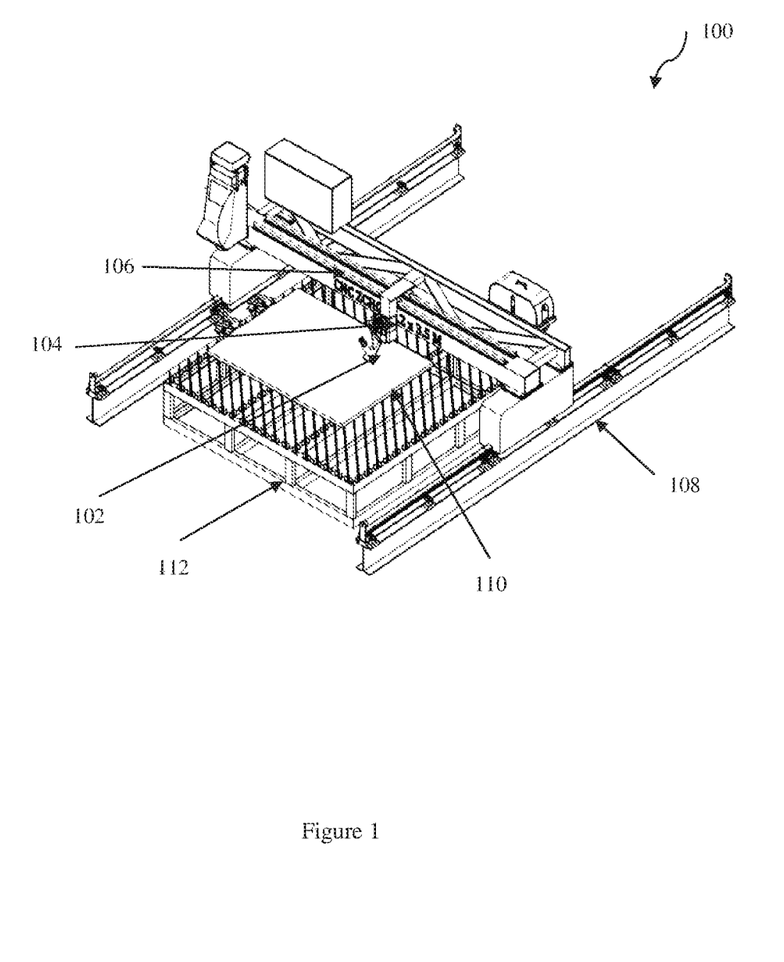
FIG. 1 illustrates an isometric view of a conventional robotic system, particularly used for a plasma cutting system.

FIG. 1 illustrates an isometric view of a conventional bridge gantry system 100.

The conventional bridge gantry system 100 comprises a tool 102, a tool carriage assembly 104, a gantry 106, a rail system 108, a controller (not shown in figure), a power supply (not shown in figure) and a cutting table 112. A workpiece 110 to be cut is disposed on the cutting table 112. The tool 102, which is a plasma torch, is mounted on the tool carriage assembly 104. The tool carriage assembly 104 is coupled to the gantry 106. The gantry 106 facilitates movement of the tool carriage assembly 104 along the X-axis. The rail system 108 comprises at least one rail. The rail is disposed on one side of the cutting table 112. The rail system 108 facilitates the movement of the gantry 106 and the tool carriage assembly 104 along Y-axis.

The conventional bridge gantry system 100 facilitates the movement of the tool 102 along the X-axis and the Y-axis using two pairs of motors and the controller. The first pair of motors facilitates the movement of the gantry 106 along the Y-axis, thereby moving the tool carriage assembly 104 along the Y-axis. The second pair of motor facilitates the movement of the tool carriage assembly 104 along the X-axis.

However, the conventional bridge gantry system requires synchronizing of two motors for X-axis movement. Further, as the conventional bridge gantry system 100 requires more number of electrical components, the conventional bridge gantry system 100 is expensive, and requires frequent maintenance. Further, the conventional bridge gantry system 100 requires more installation time, and is difficult to transport from one place to another.

The present disclosure envisages a robotic system that operates in multiple work zones, has lower inertia, is easy to transport, facilities enhanced reach for a tool, is lightweight, is less expensive, is easy to install, and has a low operating cycle time.

The robotic system, of the present disclosure, is now described with reference to FIG. 2 through FIG. 7.

Figure 2:
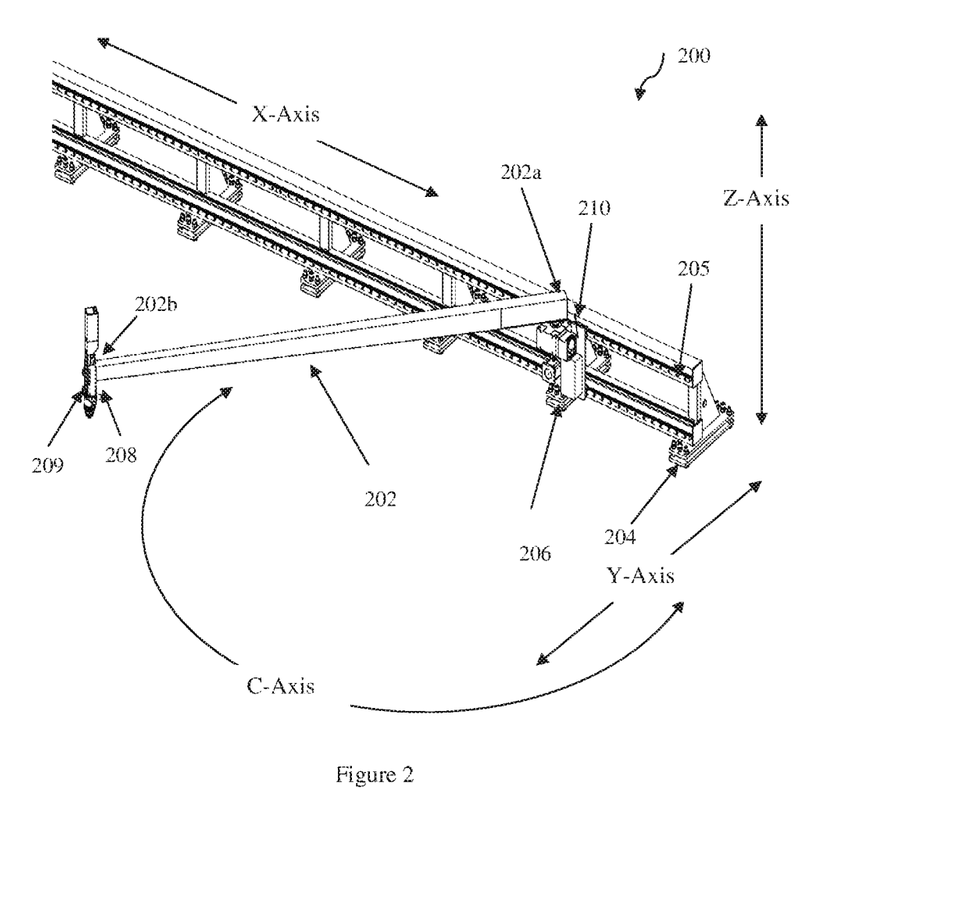
FIG. 2 illustrates a schematic view of a robotic system for carrying out an operation, in accordance with an embodiment of the present disclosure.
Figure 3:
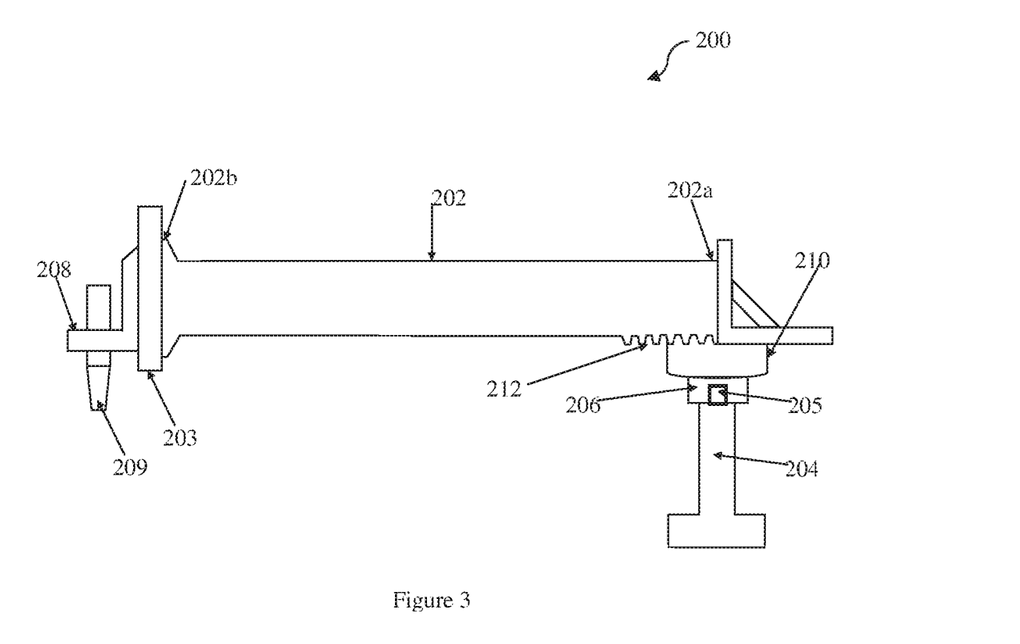
FIG. 3 illustrates a side view of the robotic system, in accordance with an embodiment of the present disclosure.
Figure 4:
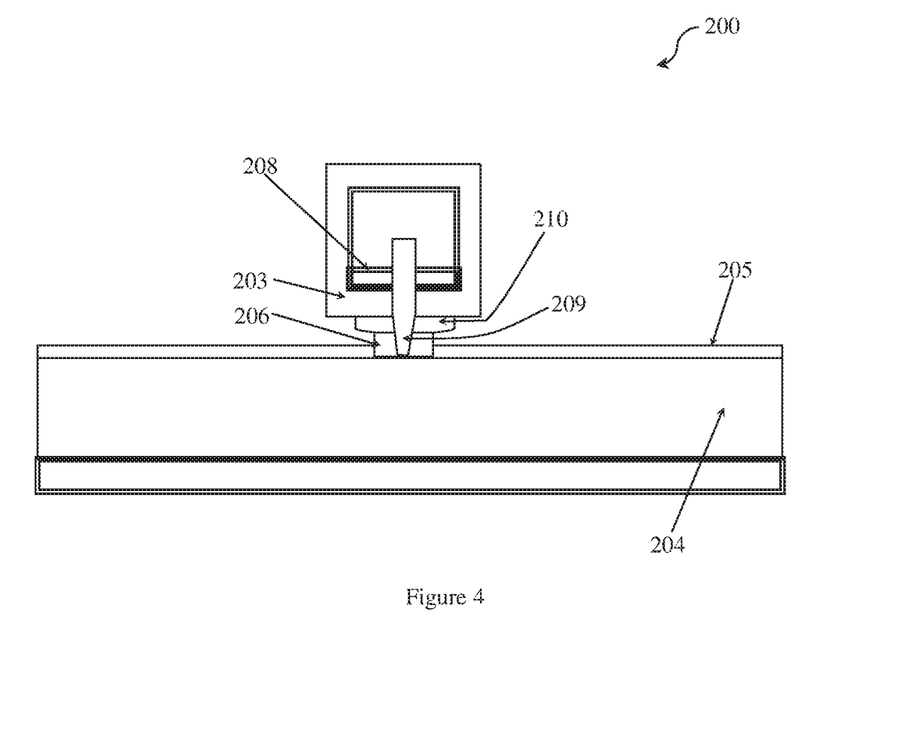
FIG. 4 illustrates a front view of the robotic system, in accordance with an embodiment of the present disclosure.
Figure 5:
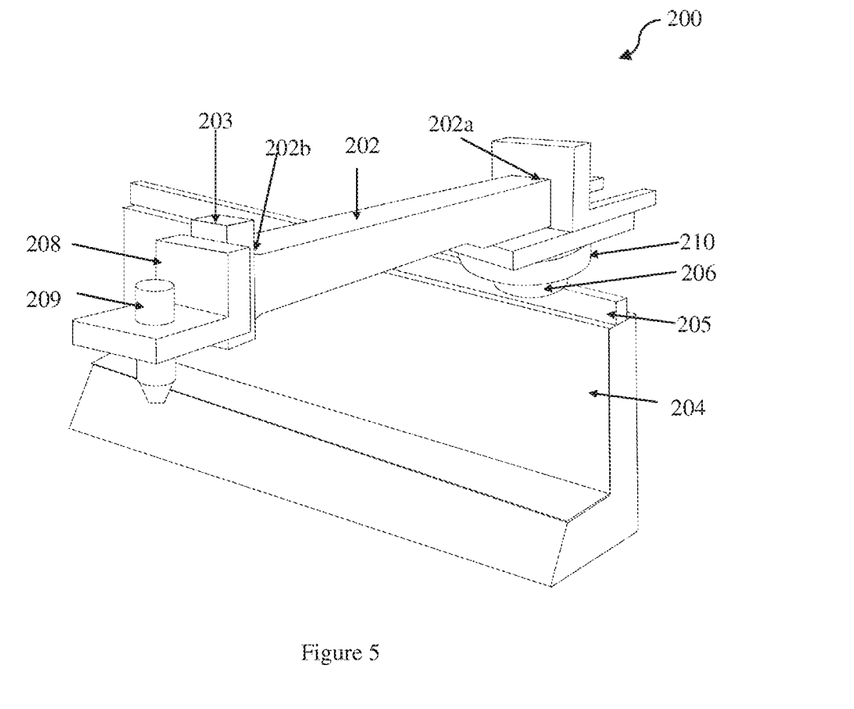
FIG. 5, FIG. 6, and FIG. 7 illustrate isometric views of the robotic system depicting different positions of the robotic system during performing an operation, in accordance with an embodiment of the present disclosure.
Figure 6:
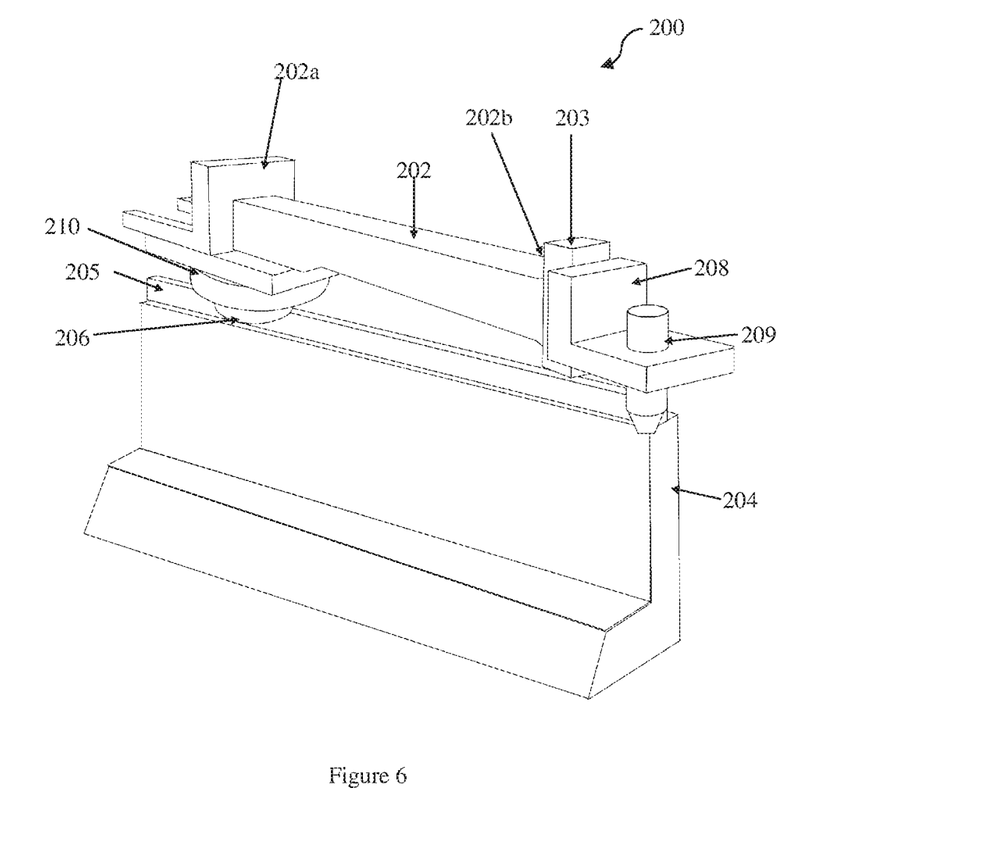
Figure 7:
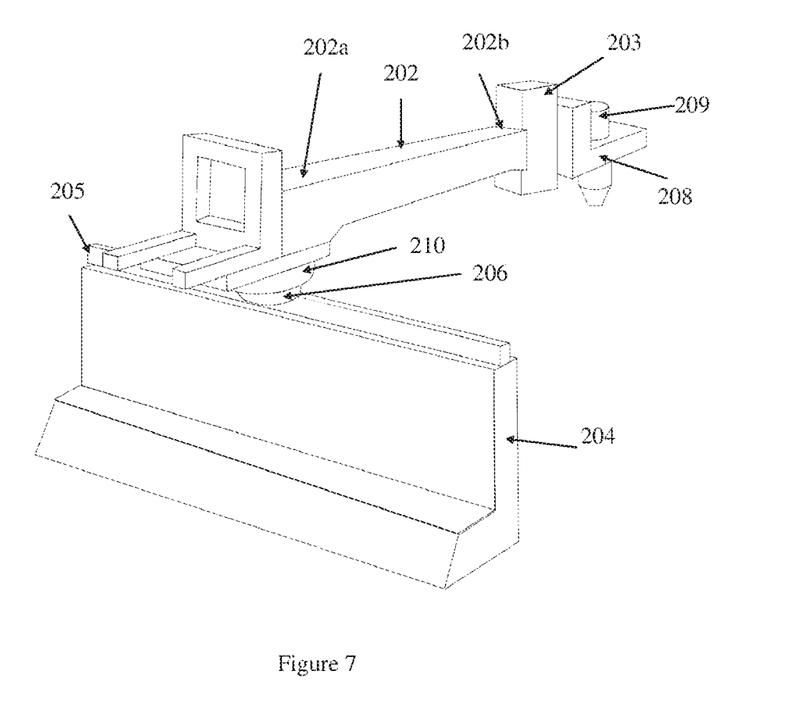

FIG. 2 illustrates an isometric view of a robotic system 200, in accordance with an embodiment of the present disclosure. FIG. 3 illustrates a side view of the robotic system 200, in accordance with an embodiment of the present disclosure. FIG. 4 illustrates a front view of the robotic system 200, in accordance with an embodiment of the present disclosure. FIG. 5, FIG. 6, and FIG. 7 illustrate isometric views of the robotic system 200 depicting different positions of the robotic system 200 during performing an operation, in accordance with an embodiment of the present disclosure. More specifically, FIG. 5 depicts the robotic system's 200 positioning of the tool in a first work zone. FIG. 6 depicts the robotic system's 200 positioning of the tool in the center. FIG. 7 depicts the robotic system's 200 positioning of the tool in a second work zone at 180 degrees to the first work zone.

The robotic system 200 comprises a first carriage 206, an arm 202, an arm swiveling mechanism 210, a second carriage 208, a first displacement mechanism 203, and a controller (not exclusively shown in figures).

The first carriage 206 is configured to be linearly displaced. In an embodiment, the system 200 comprises a supporting structure 204 configured to facilitate linear displacement of the first carriage 206 thereon. In another embodiment, the supporting structure 204 comprises at least one rail configured on the operative top surface of the supporting structure 204. The rail 205 is configured to facilitate the linear movement of the first carriage 206 thereon. In another embodiment, the supporting structure 204 comprises two rails configured on an operative top surface of the supporting structure 204. In yet another embodiment, the supporting structure 204 comprises multiple rails configured on an operative top surface of the supporting structure 204. In still another embodiment, the rail 205 is configured on an operative side surface of the supporting structure 204, and the first carriage 206 is mounted on the operative side surface of the supporting structure 204 abutting the rail 205.

In an embodiment, the system 200 comprises a trolley (not shown in figures). The first carriage 206 is mounted on the trolley. The trolley is configured to linearly displace the first carriage 206.

The arm 202 is coupled to the first carriage 206. More specifically, one operative end 202a of the arm 202 is coupled to the first carriage 206. The arm 202 is angularly displaceable along the first carriage 206. In an embodiment, the arm 202 is a robotic arm, and is of a light weight material. In another embodiment, the arm 202 is made of a material selected from the group consisting of carbon fiber, graphite fiber, carbon nanotube, fiberglass, and any other known lightweight material. In yet another embodiment, the arm 202 is made of a combination of pipes, corrugated sheets of metal and fiberglass. In an embodiment, the vibrations in the arm 202 are reduced by active damping or passive damping methods.

As the arm 202 is of light weight material, the overall weight of the system 200 is reduced. Further, the lightweight arm 202 facilitates reduction in the moving mass of the system 200. The reduction in moving mass reduces the inertia of the system 200, and enables the system 200 to precisely move the arm 202 to effectively perform any operation. Further, reduction in weight of the arm 202 reduces the vibrations experienced by the arm 202 during movement.

The configuration of the arm 202 is in accordance with an application for which the system 200 is to be used. In an embodiment, the length of the arm 202 is in the range of 100 millimeters to 3 meters.

The arm swiveling mechanism 210 is coupled to the first carriage 206 and the arm 202. The arm swiveling mechanism 210 is configured to angularly displace the arm 202 about the first carriage 206 when the first carriage 206 is displaced. The arm swiveling mechanism 210 includes a first motor (not shown in figures) configured to rotate the arm 202 about the first carriage 206.

In another embodiment, the system 200 comprises a second displacement mechanism coupled to the first carriage 206, and is configured to facilitate linear displacement of the first carriage 206 along the rail 205. In an embodiment, the second displacement mechanism includes a second motor (not shown in figures). The second motor is configured to facilitate linear movement of the first carriage 206 along the supporting structure 204.

The second carriage 208 is coupled to a free end 202b of the arm 202. The second carriage 208 is configured to securely hold a tool 209 therein. The tool 209 is any tool required for carrying out the operations. In an embodiment, the tool 209 is a plasma torch. In another embodiment, the tool 209 is a gripper configured to securely grasp objects. In yet another embodiment, the tool 209 is a vision camera. In still another embodiment, the tool 209 is a laser tool used for measurement purposes or any other purposes.

The first displacement mechanism 203 is coupled to the second carriage 208 and the arm 202. The first displacement mechanism 203 is configured to displace the second carriage 208 about the free end 202b of the arm 202.

In an embodiment, the first displacement mechanism 203 includes a third motor configured to linearly move the second carriage in an operative upward direction and an operative downward direction. In an embodiment, the first displacement mechanism 203 comprises a rail mounted on the free end 202b of the arm 202. The third motor is configured to linearly move the second carriage 208 on the rail mounted on the free end 202b.

In an embodiment, the system further comprises a tool swiveling mechanism coupled with the tool 209 and the second carriage 208, and configured to rotate the tool 209 about the free end 202b of the arm 202. The tool swiveling mechanism includes at least one motor, referred as fourth motor, to facilitate swiveling movement of the tool 209.

In an embodiment, the system 200 comprises an arm sliding mechanism (not exclusively shown in figures). The arm sliding mechanism is configured to linearly displace the arm 202 along the first carriage 206. The arm sliding mechanism is connected to the arm 202 and the first carriage 206. The arm sliding mechanism comprises a rack 212 and pinion arrangement (not shown in figures). The rack 212 is connected to the arm 202. The pinion abuts the rack 212, and is connected to the first carriage 206. More specifically, the pinion is in abutting relationship with the rack 212. The arm sliding mechanism further comprises a fifth motor (not shown in figures) coupled to the pinion. The fifth motor rotates the pinion, thereby sliding the rack 212 and the arm 202 along the first carriage 206. The arm sliding mechanism facilitates alteration in the length and reach of the arm 202 whenever required.

In an embodiment, each of the first motor, the second motor, the third motor, the fourth motor, and the fifth motor is selected from the group consisting of linear motors, servo motors, variable speed motors, and any combination thereof.

The controller (not shown in figures) is adapted to synchronize the movement of the first carriage 206, the arm 202, and the second carriage 208 to perform an operation. More specifically, the controller cooperates with the first motor, the second motor, the third motor, the fourth motor, and the fifth motor to concurrently control the movement of the first carriage 206, the arm 202, and the second carriage 208 to carry out an operation.

In an embodiment, the controller is coupled to a power unit (not shown in figures). The power unit is configured to provide voltage to the controller.

The operation carried out by using the robotic system 200 includes, but not limited to, welding, cutting, grasping an object, moving an object from one place to another, lifting an object, inspecting objects using a vision camera, and checking dimensions of an object using laser systems.

The system 200 further comprises a rotating member (not shown in figures) disposed at each operative end of the rail 205 of the supporting structure 204. The rotating member is configured to facilitate rotational movement of the rails 205, thereby rotating the first carriage 206. In another embodiment, the rotating member is a gear mechanism (not shown in figure) disposed at the operative ends of the rail 205. In yet another embodiment, the gear mechanism is disposed at an operative middle portion of the rail 205.

The system comprises an arm rotation mechanism (not shown in figures) configured to facilitate rotational movement of the arm 202 about the longitudinal axis of the arm 202. The arm rotation mechanism includes a sixth motor configured to facilitate rotational movement of the arm 202 about the longitudinal axis of the arm 202.

The rotational and translational movements of the system 200 are now described in detail. The first carriage 206 is linearly displaceable along X-axis (as shown in FIG. 2). The second displacement mechanism facilitates linear displacement of the first carriage 206 along the X-axis. The arm 202 is movable along the rotary C-axis (as shown in FIG. 2). Further, the arm 202 is also linearly displaceable along the first carriage 206 in the Y-axis (as shown in FIG. 2). The arm swiveling mechanism 210 facilitates the rotational movement of the arm 202 along the rotary C-axis.

In an embodiment, the first carriage 206 and the arm 202 are simultaneously displaced. More specifically, the arm 202 is angularly displaced about the first carriage 206 when the first carriage 206 is linearly displaced along the rail 205.

Further, the arm sliding mechanism facilitates the sliding movement of the arm 202 along the first carriage 206. Furthermore, the second carriage 208 is linearly displaceable in an operative upward and downward direction about the free end 202b of the arm 202. In an embodiment, the second carriage 208 is linearly displaceable along Z-axis (as shown in FIG. 2). The first displacement mechanism facilitates the sliding movement of the second carriage 208 along the free end 202b. The rail 205 is rotatable along X-axis. The rotating member facilitates rotation of the rail 205 along the X-axis. In yet another embodiment, the first carriage 206 is rotatable along the X-axis. A first carriage swiveling mechanism (not shown in figures) is configured to rotate the first carriage 206 about the supporting structure 204 along the X-axis. The first carriage swiveling mechanism includes a seventh motor mounted on the first carriage 206, and configured to rotate the first carriage 206 about the supporting structure 204.

Further, the tool 209 is also rotatable along the free end 202b of the arm 202. The tool swiveling mechanism facilitates the rotation of the tool 209. In an embodiment, the tool 209 is coupled with the second carriage 208 via an articulated arm configured to facilitate the movement of the tool 209. In yet another embodiment, the tool 209 is coupled to the second carriage 208 via a swinging and rotary arrangement. In yet another embodiment, the tool 209 is coupled with the second carriage 208 via a robotic wrist mechanism to facilitate wrist movement of the tool 209.

In an embodiment, the combined movement of the first carriage 206, the arm 202, and the second carriage 208 facilitate precise operation of the tool 209. More specifically, the controller is adapted for synchronizing the linear movement of the first carriage along the X-axis, the rotary movement of the arm 202 along the rotary C-axis, and the linear movement of the second carriage 208 along the Z-axis to effectively perform the operation.

In an embodiment, the rotary movement of the arm 202 along the rotary C-axis increases the reach of the tool 209 as the tool 209 can reach closer to the rail 205.

In an embodiment, the arm 202 is rotatable about the longitudinal axis thereof. The arm rotation mechanism facilitates the rotational movement of the arm 202 about the longitudinal axis of the arm 202.

In yet another embodiment, the system 200 comprises a moving structure, such as a trolley.

The first carriage 206 is mounted on the trolley. The linear displacement of the first carriage 206 is achieved by moving the trolley.

In an embodiment of the present disclosure, the supporting structure 204 is disposed on the ground. In another embodiment, the supporting structure 204 is mounted overhead. More specifically, the supporting structure 204 is securely suspended at a predetermined height from the ground level. The first carriage 206 is then securely connected to an operative bottom portion of the supporting structure 204, and is displaceable along the supporting structure 204. The rail 205 is configured on the operative bottom surface of the supporting structure 204. The overhead mounting of the supporting structure 204 increases the reach of the tool 209 as the tool 209 can perform the operation in the space formed operatively below the supporting structure 204.

Therefore, by combining the aforementioned movements, the arm 202, and hence the tool 209, can reach and perform operations in X-axis, Y-axis, and rotary C-axis. In an embodiment, the tool 209 has six degrees of freedom which can be achieved by combining the aforementioned movements.

The rotatable movement of the arm 202 along the rotary C-axis facilitates enhanced reach of the tool 209. Further, the robotic system 200 can perform operations in multiple work zones due to the movement of the arm 202 along the rotary C-axis. More specifically, in case of picking objects, the tool 209 can pick object from one side of the supporting structure 204, and can place the object on the other side of the supporting structure 204. The placed object can be further operated when the system 200 is picking next object. Thus, various operations can be performed on the objects simultaneously. In an embodiment, the arm 202 is movable in 360° along the rotary C-axis enabling the system 200 to perform operations in at least four work zones.

In the robotic system 200, the reach of the tool 209 can be increased by increasing the length of the arm 202, which is cost effective, and does not require more number of motors.

In the robotic system 200, the load bearing capacity of the arm 202 can be increased by increasing the dimensions of the arm 202.

As compared to conventional robotic systems, cable management is easier in the system 200 due to its compact and less complicated structure.

In an embodiment, all the aforementioned motors, are mounted on the first carriage 206, which makes the system 200 compact. Due to the aforementioned arrangement, the arm 202 bears only the payload of tool 209. Reduction in payload on the arm 202 reduces the vibrations in the arm 202. Further, the compact structure of the system 200 saves valuable space on the shop floor as the system 200 has smaller footprint on the shop floor.

The robotic system 200 is particularly useful in a manufacturing industry where heavy objects are required to be displaced or handled. Further, in one application, the system 200 is useful to handle welding tools for welding applications. The system 200 is useful in performing cutting operations using methods such as plasma cutting, flame cutting, or water jet cutting. Further, the system 200 is also useful in carrying out painting operations on a workpiece. The system 200 can also be used for engraving and marking an object typically made of glass or wood. The system 200 is useful in handling laser tools, and drilling operations.

Further, the system 200 performs the operations using the tool 209 with high accuracy. The arm swiveling mechanism 210 is configured such that it displaces the tool 209 with high accuracy, thereby achieving accurate positioning of the tool 209 and reducing the errors.

Due to use of lightweight material in the manufacturing of the arm 202, the system 200 is light in weight, and can be easily transferred from one place to another. Further, as compared to the conventional gantry system, the system 200 is versatile is nature, and can perform operations in multiple work zones. Further, the configuration of the system 200 is not as complex as a six axis robot, also known as an articulated arm robot. Thus, the system 200 is less bulky, and requires less installation time.

TECHNICAL ADVANCEMENTS

The present disclosure described herein above has several technical advantages including, but not limited to, the realization of a robotic system that:

operates in multiple work zones;
has lower inertia;
is easy to transport;
can operate in proximal vicinity thereof as compared to a gantry system and conventional robotic systems;
eliminates the issue of singularity wherein multiple axis gets locked;
is lightweight;
is suitable for a plurality of applications;
is less expensive;
is easy to install;
has a low operating cycle time;
is easily transportable and can work at multiple locations on the shop floor; and
occupies less space, thereby saving valuable space on the shop floor.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A robotic system (200) for carrying out an operation, said system (200) comprising:
   a first carriage (206) configured to be linearly displaced;
   an arm (202) coupled to said first carriage (206);
   an arm swiveling mechanism (210) coupled to said first carriage (206) and said arm (202), and configured to angularly displace said arm (202) when said first carriage (206) is linearly displaced;
   a second carriage (208) coupled to a free end (202b) of said arm (202);
   a first displacement mechanism (203) coupled to said second carriage (208) and said arm (202), and configured to displace said second carriage (208) about said free end (202b) of said arm (202); and
   a controller adapted for synchronizing the movement of said arm (202), said first carriage (206), and said second carriage (208) to perform an operation.

2. The system (200) as claimed in claim 1, wherein said arm swiveling mechanism (210) includes a first motor configured to rotate said arm (202) about said first carriage (206).

3. The system (200) as claimed in claim 1, which comprises a supporting structure (204) configured to facilitate linear displacement of said first carriage (206) thereon.

4. The system (200) as claimed in claim 3, wherein at least one rail (205) is configured on said supporting structure (204) to facilitate linear movement of said first carriage (206) thereon.

5. The system (200) as claimed in claim 3, which comprises a second displacement mechanism coupled to said first carriage (206) and configured to facilitate linear displacement of said first carriage (206) along said supporting structure (204).

6. The system (200) as claimed in claim 5, wherein said second displacement mechanism includes a second motor configured to facilitate linear movement of said first carriage (206) along said supporting structure (204).

7. The system (200) as claimed in claim 1, wherein said first displacement mechanism (203) includes a third motor configured to linearly move said second carriage (208) in an operative upward and an operative downward direction.

8. The system (200) as claimed in claim 1, which comprises a tool swiveling mechanism having at least one motor, wherein said tool swiveling mechanism is coupled with said second carriage (208), and configured to rotate a tool (209) about said free end (202b) of said arm (202).

9. The system (200) as claimed in claim 1, which comprises a trolley configured to linearly displace said first carriage (206).

10. The system (200) as claimed in claim 1, wherein said operation is selected from the group consisting of welding, cutting, grasping an object, moving an object from one place to another, and lifting an object.

11. The system (200) as claimed in claim 1, wherein said second carriage (208) is configured to hold a tool (209) for performing said operation.

12. The system (200) as claimed in claim 1, wherein said arm swiveling mechanism is configured to move said arm (202) about said first carriage (206) along the rotary C-axis.

13. The system (200) as claimed in claim 1, which comprises an arm sliding mechanism connected to said first carriage (206) and said arm (202), and configured to linearly displace said arm (202) about said first carriage (206).

14. The system (200) as claimed in claim 13, wherein said arm sliding mechanism includes:
   a rack (212) connected to said arm (202);
   a pinion abutting said rack (212), and connected to said first carriage (206); and
   a fifth motor coupled to said pinion, and configured to rotate said pinion.

15. The system (200) as claimed in claim 4, which comprises a rotating member disposed at each operative end of said rail (205), and configured to facilitate rotational movement of said rail (205), thereby rotating said first carriage (206).

16. The system (200) as claimed in claim 1, wherein said system (200) comprises a first carriage swiveling mechanism coupled with said first carriage (206), and configured to rotate said first carriage (206).

17. The system (200) as claimed in claim 3, wherein said supporting structure (204) is securely suspended at a predetermined height from the ground level, and said first carriage (206) is securely connected to an operative bottom portion of said supporting structure (204).

18. The system as claimed in claim 1, which comprises an arm rotation mechanism configured to facilitate rotational movement of said arm (202) about the longitudinal axis of said arm (202).

19. The system as claimed in claim 1, wherein a tool (209) is coupled with said second carriage (208) via a mechanism selected from the group consisting of an articulated robotic arm, robotic wrist, and any combination thereof.

\* \* \* \* \*